US010269459B2

(12) United States Patent
Dahlbäck et al.

(10) Patent No.: US 10,269,459 B2
(45) Date of Patent: Apr. 23, 2019

(54) FUEL CHANNEL FOR A NUCLEAR POWER BOILING WATER REACTOR

(71) Applicant: Westinghouse Electric Sweden AB, Västerås (SE)

(72) Inventors: Mats Dahlbäck, Västerås (SE); Sture Helmersson, Kolbäck (SE)

(73) Assignee: Westinghouse Electric Sweden AB, Västerås (SE)

( * ) Notice: Subject to any disclaimer, the term of this patent is extended or adjusted under 35 U.S.C. 154(b) by 303 days.

(21) Appl. No.: 14/784,858

(22) PCT Filed: Mar. 28, 2014

(86) PCT No.: PCT/SE2014/050379
§ 371 (c)(1),
(2) Date: Oct. 15, 2015

(87) PCT Pub. No.: WO2014/171880
PCT Pub. Date: Oct. 23, 2014

(65) Prior Publication Data
US 2016/0055923 A1   Feb. 25, 2016

(30) Foreign Application Priority Data
Apr. 18, 2013   (SE) ...................... 1350487

(51) Int. Cl.
*G21C 3/00*   (2006.01)
*G21C 3/04*   (2006.01)
(Continued)

(52) U.S. Cl.
CPC .............. *G21C 3/324* (2013.01); *G21C 3/00* (2013.01); *G21C 3/04* (2013.01); *G21C 3/06* (2013.01);
(Continued)

(58) Field of Classification Search
CPC ... G21C 3/30; G21C 3/06; G21C 3/00; G21C 3/04; G21C 3/32; G21C 3/36; G21C 3/38;
(Continued)

(56) References Cited

U.S. PATENT DOCUMENTS 3,356,587 A * 12/1967 Heck, Jr. ................. G21C 1/02
                                            376/445
3,361,639 A *  1/1968 Ashcroft ................ G21C 3/326
                                            376/441
(Continued)

FOREIGN PATENT DOCUMENTS

| GB | 1598330 | 9/1981 |
|----|---------|--------|
| JP | 01-227991 A | 9/1989 |

(Continued)

OTHER PUBLICATIONS

International Preliminary Report on Patentability issued in corresponding PCT Application No. PCT/SE2014/050379, dated Oct. 29, 2015, pp. 1-6.

*Primary Examiner* — Jack W Keith
*Assistant Examiner* — Sandra Herrick
(74) *Attorney, Agent, or Firm* — Murtha Cullina LLP (57) ABSTRACT

A fuel channel for a nuclear power boiling water reactor is configured to include a bundle of fuel rods with nuclear fuel. The fuel channel is made of a sheet material and has a plurality of sides which have an elongated shape and which are connected to each other such that a corner with an elongated shape is formed where two adjacent sides meet. In one or more corners, the sheet materials from the two adjacent sides overlap with each other such that there is a corner region with double sheet material consisting of the overlapping sheet material from one of the two sides and the overlapping sheet material from the other of the two sides.

26 Claims, 4 Drawing Sheets

(51) Int. Cl.
*G21C 3/06* (2006.01)
*G21C 3/30* (2006.01)
*G21C 3/32* (2006.01)
*G21C 3/36* (2006.01)
*G21C 3/38* (2006.01)
*G21C 3/322* (2006.01)
*G21C 3/324* (2006.01)
*G21C 3/326* (2006.01)
*G21C 3/334* (2006.01)
*G21C 3/335* (2006.01)
*G21C 3/344* (2006.01)
*G21C 3/348* (2006.01)
*G21C 3/352* (2006.01)

(52) U.S. Cl.
CPC ............... *G21C 3/30* (2013.01); *G21C 3/32* (2013.01); *G21C 3/322* (2013.01); *G21C 3/326* (2013.01); *G21C 3/334* (2013.01); *G21C 3/335* (2013.01); *G21C 3/344* (2013.01); *G21C 3/348* (2013.01); *G21C 3/352* (2013.01); *G21C 3/36* (2013.01); *G21C 3/38* (2013.01); *Y02E 30/40* (2013.01)

(58) Field of Classification Search
CPC ........ G21C 3/322; G21C 3/324; G21C 3/326; G21C 3/334; G21C 3/335; G21C 3/344; G21C 3/348; G21C 3/352
USPC .................................................. 376/443, 444
See application file for complete search history.

(56) References Cited

U.S. PATENT DOCUMENTS

| | | | | |
|---|---|---|---|---|
| 3,481,021 A | * | 12/1969 | Skar | G21C 3/324 29/463 |
| 3,791,466 A | * | 2/1974 | Patterson | G21C 3/32 376/441 |
| 3,844,887 A | * | 10/1974 | Georges | G21C 3/348 165/162 |
| 3,928,126 A | * | 12/1975 | Seim | G21C 1/303 376/202 |
| 4,678,627 A | * | 7/1987 | Rylatt | G21C 3/32 376/313 |
| 4,749,543 A | | 6/1988 | Crowther et al. | |
| 4,749,544 A | | 6/1988 | Crowther et al. | |
| 5,128,098 A | * | 7/1992 | Nakamura | G21C 3/322 376/352 |
| 5,253,278 A | * | 10/1993 | Kanazawa | G21C 3/324 376/260 |
| 5,390,222 A | * | 2/1995 | Rau | G21C 3/32 376/364 |
| 5,473,649 A | * | 12/1995 | Olsson | G21C 3/32 376/313 |
| 5,490,192 A | * | 2/1996 | Nakajima | G21C 3/344 376/439 |
| 5,872,826 A | * | 2/1999 | Fujieda | G21C 3/324 376/419 |
| 6,088,420 A | * | 7/2000 | Yokoyama | G21C 1/00 376/434 |
| 6,236,701 B1 | * | 5/2001 | Nylund | G21C 3/322 376/443 |
| 6,516,043 B1 | * | 2/2003 | Chaki | G21C 3/324 376/434 |
| 8,040,998 B1 | * | 10/2011 | Koga | G21C 1/02 376/361 |
| 2006/0144484 A1 | | 7/2006 | Dahlback | |

FOREIGN PATENT DOCUMENTS

| | | |
|---|---|---|
| JP | 04-299283 A | 10/1992 |
| JP | 09-145874 A | 6/1997 |
| WO | 2010110721 A1 | 9/2010 |

* cited by examiner

FUEL CHANNEL FOR A NUCLEAR POWER BOILING WATER REACTOR

FIELD OF THE INVENTION

The present invention concerns a fuel channel for a nuclear power boiling water reactor. The fuel channel is configured to include a bundle of fuel rods with nuclear fuel. The fuel channel is made of a sheet material and has an elongated shape and thus defines a longitudinal direction. The fuel channel has a plurality of sides which have an elongated shape in the longitudinal direction and which are connected to each other such that a corner with an elongated shape is formed where two adjacent sides meet. The sides are connected to each other such that the fuel channel thus has as many corners as sides, wherein each side defines an inside, in the fuel channel, and an outside, at the outside of the fuel channel. The invention also concerns a fuel assembly for a nuclear power boiling water reactor.

BACKGROUND OF THE INVENTION

A boiling water reactor (BWR) which is used at a nuclear power plant is known to a person with knowledge within the field. In a BWR the core consists of a large number of fuel assemblies. Each fuel assembly contains, inter alia, a bundle of fuel rods, which contain the fissile nuclear fuel material. The bundle is surrounded by a fuel channel. When such a fuel assembly is used in a BWR, water flows through the fuel channel. The water is brought to boiling by the heat which is generated through the nuclear reaction. Through this process a relatively high pressure is formed in the fuel channel. The walls of the fuel channel may therefore tend to bulge outwards. This can have negative consequences. Between several fuel assemblies, control rod blades are inserted in order to control the nuclear reaction. If the walls of the fuel channel bulge outwards, the walls may press against such an inserted control rod blade. It may therefore become difficult to pull out the control rod blade when desired.

A further problem which can be mentioned is that which is called shadow corrosion. Shadow corrosion is a phenomenon within this technical field. Shadow corrosion may occur in a nuclear reactor. In particular, shadow corrosion may occur on components of Zr or Zr-based alloys when such components come into contact with (or are positioned at a very short distance from) components of other materials, such as of stainless steel. The fuel channel is normally made of a Zr-based alloy, while the control rod blades often are made of stainless steel. If the fuel channel bulges outwards, a larger area of the walls of the fuel channel may thus come into contact with (or be positioned very close to) the control rod blades, which can cause shadow corrosion to potentially occur on the fuel channel.

U.S. Pat. No. 5,253,278 describes a fuel assembly which comprises a fuel channel which surrounds a bundle of fuel rods. The fuel channel is provided with a number of "reinforcing tabs".

U.S. Pat. No. 4,749,543 describes a fuel assembly with a fuel channel which may be provided with longitudinal or transversal grooves. The fuel channel can also have particularly thick corner sections.

Japanese Patent Document No. JP 9-145 874 shows fuel assemblies with a fuel channel which may have an L-shaped piece which is attached by welding in a corner.

International Patent Publication No. WO 2010/110721 A1 describes a fuel assembly with a fuel channel which is provided with a number of protrusions on the side. The document also describes the problem with shadow corrosion.

SUMMARY OF THE INVENTION

An object of the present invention is to provide a fuel channel which has improved stiffness in order to prevent the walls of the fuel channel from bulging outwards. A further object is to achieve such a fuel channel with relatively simple means. A further object is to achieve such a fuel channel which is relatively simple to produce.

These objects are achieved with a fuel channel in which at least one or more of the corners, the sheet materials from the two adjacent sides overlap with each other such that there is a corner region with double sheet material consisting of the overlapping sheet material from one of the two sides and the overlapping sheet material from the other of the two sides.

Because of the overlapping sheet materials, the stiffness of the fuel channel is increased. The fuel channel is thus strengthened. Thereby the risk is reduced that the sides of the fuel channel bulge outwards. Such a fuel channel is also relatively simple to produce since an overlap from the two adjacent sides is used. Furthermore, a thinner sheet material can be used, since the desired stiffness is achieved by the fact that the sheet materials overlap in the corner region. Previously, in cases where the fuel channel had thicker corner regions, usually a thicker sheet has been used, which has then been worked in order to remove material where the sheet should be thinner than in the corners. As used herein, the terms "stiff" or "stiffness" primarily mean that the sides of the fuel channel are stiff in such a manner that outward bulging of the sides is prevented.

According to an embodiment of the fuel channel according to the invention, in at least two of the corners, preferably in all corners, the sheet materials of the for the corner of two adjacent sides overlap with each other. Preferably the fuel channel is thus configured such that all corners have a corner space with overlapping sheet materials. Thereby the fuel assembly is strengthened over all its sides. A very stiff fuel assembly is thereby obtained.

According to a further embodiment of the fuel channel, each of the one or more corner regions with overlapping sheet materials extends along at least 25% of the length of the fuel channel, preferably along at least 50% of the length of the fuel channel, most preferred along substantially the entire length of the fuel channel. It is possible that the corner region or the corner regions with overlapping sheet materials only extend over a part of the fuel channel, where the risk for bulging is highest. The risk for bulging is highest in the lower part of the fuel channel. However, preferably the corner regions extend along the entire length of the fuel channel.

According to a further embodiment of the fuel channel, in the at least one corner, or in more than one of or in all of the corners, the sheet materials from the two adjacent sides overlap with each other in such a manner that in the overlapping region a space is formed between the overlapping sheet material from one of the two sides and the overlapping sheet material from the other of the two sides. The inner one of the two overlapping sheet materials thus extends such that the space is formed. Since the sheet material has such a configuration, the stiffness of the fuel channel is further increased. Such a fuel channel is also relatively simple to produce. The space can also be used, for example, as a channel for non-boiling water. The space may, for example, have a cross-sectional area which is at least 20 mm$^2$, or at least 35 mm$^2$. It should however be noted that according to an alternative embodiment (which is described in connection with FIGS. 6 and 7) there is substantially no space between the overlapping sheet materials.

According to a further embodiment of the fuel channel, each of the one or more spaces is open at both ends, as seen in the longitudinal direction. It is thereby made possible that water can flow in the space which is formed in the corners. Water that flows through the spaces also contributes to some degree to the moderation of the neutrons in the nuclear power reactor. When it is said that the space is open at the ends, this includes the possibility that the space at the ends is open sideways: outwards and/or inwards. The space can of course also be open straight upwards and straight downwards. It should in this context also be mentioned that according to an alternative embodiment, the space may be closed at both ends, such that a closed space is obtained.

According to a further embodiment of the fuel channel, in at least one corner, preferably in more than one corner, or most preferred in all corners, the inner one of the two overlapping sheet materials is substantially straight, while the outer one of the two overlapping sheet materials is bent in order to form the outer corner shape, such that said space, as seen in a cross section of the fuel channel, has substantially the shape of a triangle, but where one corner is bent, or the shape of an arc which is limited by a straight line. By such a design, the strengthening of the fuel channel is achieved in a simple manner. It should however be mentioned that the overlapping sheet materials also can have another shape. For example, also the inner one of the two overlapping sheet materials may be bent, either in a convex or concave manner, as seen from the interior of the fuel channel.

According to a further embodiment of the fuel channel, it is the case that in each corner which has a corner region with overlapping sheet materials, the inner overlapping sheet material, as seen in a cross section of the fuel assembly, extends from a first point at a first side to a second point at a second, adjacent, side, wherein the first side defines a first plane, or a first line if a cross section is considered, and the second side defines a second plane, or a second line if a cross section is considered, wherein the distance between the first point and the second plane, or the second line, is 10-25 mm, preferably 13-19 mm and the distance between the second point and the first plane, or the first line, is 10-25 mm, preferably 13-19 mm. It has appeared that the mentioned distances are very suitable in order to obtain an optimal stiffness of the fuel channel without using too much sheet material or without "stealing" (e.g., occupying) too much space in the fuel channel. A fuel assembly with such a fuel channel can have a reduced number of fuel rods (compared to a situation when the fuel channel does not have any strengthening in the corners), wherein the number of fuel rods with which the fuel assembly has been reduced is equal to the number of corners, which means that one fuel rod has been "removed" in each corner. The advantage with a fuel assembly with a stiff fuel channel is thus achieved without any need for reducing the number of fuel rods to any higher degree.

According to a further embodiment, the fuel channel includes for each of the one or more corner regions with overlapping sheet materials, two weld joints, which each extends in the longitudinal direction, wherein one weld joint connects the two overlapping sheet materials at one end of the corner region with the overlapping sheet materials, or at a corner of the space, and the second weld joint connects the two overlapping sheet materials at the other end of the corner region with the overlapping sheet materials, or at another corner of the space. By welding together the sheet materials in this manner, the fuel channel according to the invention is achieved in a relatively simple manner, at the same time as it is ensured that the fuel channel is designed to be very durable.

According to a further embodiment of the fuel channel, each corner in the fuel channel includes one of the corner regions with overlapping sheet materials, wherein the fuel channel is formed by a number of sheets, which is equal to the number of sides, wherein all sheets have substantially the same shape, wherein each sheet has a first edge, configured such that it constitutes the inner one of the two overlapping sheet materials of one corner, and a second edge configured such that it constitutes the outer one of the two overlapping sheet materials of another corner. This embodiment has inter alia the advantage that all sheets can be made in the same manner, since they have substantially the same shape. A fuel channel according to the invention can thus be achieved in a simple manner by the fact that a number of substantially identical sheets are joined. If the fuel channel has a square shape, only four such sheets are thus needed.

According to a further embodiment of the fuel channel, each corner in the fuel channel comprises one of the corner regions with overlapping sheet materials, wherein the fuel channel is formed by an even number of sheets, which is equal to the number of sides, wherein half of the sheets have substantially the same shape, wherein each of these sheets has a first edge, configured such that it constitutes the inner one of the two overlapping sheet materials of one corner, and a second edge configured such that it constitutes the inner one of the two overlapping sheet materials of another corner, wherein the second half of the sheets has another shape than that of the sheets of said first mentioned half, wherein the sheets of the second half have substantially the same shape, wherein each of these sheets of the second half has a first edge, configured such that it constitutes the outer one of the two overlapping sheet materials of one corner, and a second edge configured such that it constitutes the outer one of the two overlapping sheet materials of another corner. The fuel channel according to this embodiment has the advantage that each sheet is symmetric relative to a centre line. Also a fuel channel according to this embodiment can be produced in a simple manner.

According to a further embodiment of the fuel channel, each side is provided with a plurality of elongated bulges and/or indentations, which extend substantially perpendicular to the longitudinal direction of the fuel channel, and which contribute to increasing the stiffness of the fuel channel. Through such bulges or indentations the stiffness is further increased. Through the combination of the design of the corners and such bulges or indentations a very stiff fuel channel is obtained. It is thereby in an efficient manner prevented that the sides of the fuel channel bulge outwards. The bulges/indentations may have a certain angle relative to the perpendicular direction, but preferably the bulges/indentations extend completely perpendicular to the longitudinal direction of the fuel channel.

According to a further embodiment of the fuel channel, at least the majority of the bulges and/or indentations, preferably all bulges and/or indentations, have a length of 30-80 mm, preferably 40-60 mm, and a width of 4.0-13.0 mm, preferably 5.0-8.0 mm. The inventors of the present invention have realised that such a size of the bulges or indentations is optimal in order to increase the stiffness of the fuel channel. The distance between the bulges or indentations may vary. A suitable distance, at least in the lower part of the fuel channel where the stresses are the highest, is 6-18 mm, preferably 9-15 mm, most preferred 10-14 mm. The bulges may suitably be arranged that close at least at the lower meter of the fuel channel. Of course the same distance may also be the case over the whole length of the fuel channel. By distance is here meant the distance in the longitudinal direction of the fuel channel between the centre of one bulge/indentation and the centre of the next bulge/indentation.

According to a further embodiment of the fuel channel, at least the majority, preferably all, of the bulges and/or indentations bulge out and curve in, respectively, between 0.50-1.50 mm from the main surface of the outside and the inside, respectively. Such a size of the bulges or indentations has appeared very suitable in order to achieve optimal stiffness of the fuel channel. The main surface is preferably flat and consists of the part of the sheet which has not deformed in order to form for example the bulges.

According to a further embodiment of the fuel channel, each side comprises at least 50, preferably at least 80, of the bulges and/or indentations. Suitably, each side may comprise at least 200 bulges and/or indentations. Such a number of bulges or indentations has appeared to be suitable in order to achieve desired stiffness of the fuel channel.

According to a further embodiment of the fuel channel, at least 50%, preferably 100%, of the bulges and/or indentations are bulges. Bulges have the advantage that they ensure a certain distance between the main surface on the outside of the fuel channel and a possible control rod blade. Through such bulges it becomes easier to push in and pull out the control rod. Furthermore, shadow corrosion on the main surfaces of the fuel channel is prevented, since a shadow corrosion now basically only can occur on the bulges themselves.

According to a further embodiment of the fuel channel, the sheet material which forms the sides of the fuel channel has substantially a constant thickness, except for at the places where the thickness has been modified by deformation when forming the fuel channel, such as at the corners or the bulges and/or indentations, or at the corner regions where the sheet materials overlap, and where therefore a total thickness of two sheets is the case, but where each sheet has substantially the same thickness as the sheets have at the sides between the corner regions. In order to obtain a sufficient stiffness it has previously often been necessary to either use a relatively thick sheet material or to vary the thickness of the sheet material such that an increased stiffness is achieved at the most vulnerable places. However, according to the present invention the stiffness is achieved through other means, such as has been described above, and it is therefore not necessary to use a sheet material with varying thickness. The production of the fuel channel is thereby simplified. Furthermore, a relatively thin sheet may be used for the fuel channel according to the present invention. Suitably a sheet is used which is thinner than 2.50 mm, preferably thinner than 2.00 mm.

A further object of the present invention is to provide an improved fuel assembly for a nuclear power boiling water reactor. Such a fuel assembly is achieved in that it comprises a fuel channel according to any of the previous embodiments and a plurality of fuel rods with nuclear fuel material arranged such that the fuel channel surrounds the fuel rods.

Such a fuel assembly thus has a fuel channel with the advantages which have been described above.

DETAILED DESCRIPTION

Figure 1:
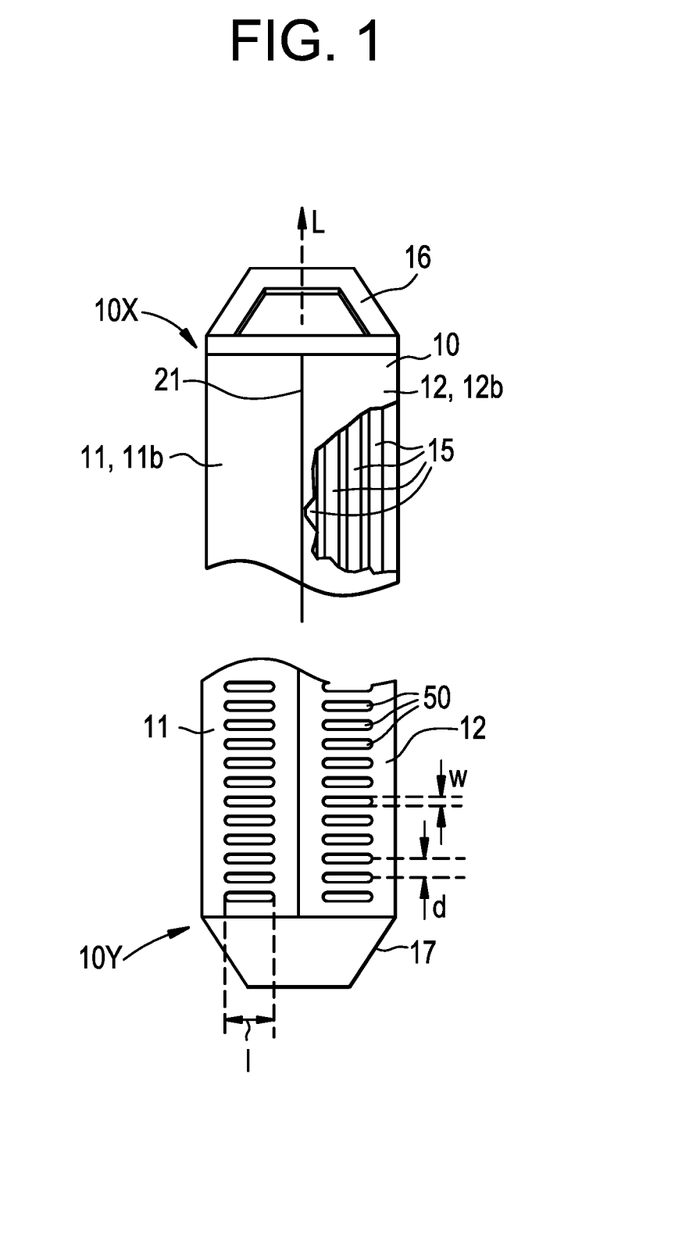
FIG. 1 is a schematic side view of an embodiment of a fuel assembly according to the invention, comprising an embodiment of a fuel channel according to invention.

FIG. 1 is a side view of an embodiment of a fuel assembly according to the invention for a nuclear power boiling water reactor. The fuel assembly comprises a fuel channel 10. The fuel channel 10 is made of a sheet material, preferably of a Zr-based alloy. The fuel channel 10 has an elongated shape and thus defines a longitudinal direction L. The fuel channel 10 may for example be about 4 m long.

In FIG. 1 an upper and a lower part of a fuel channel 10 are shown. The fuel channel 10 has a number of sides, usually four sides (each side also referred to as a major side) 11, 12, 13, 14 (see also FIGS. 2-5). Preferably the fuel channel 10, as seen in a cross-section (see FIGS. 3 and 4) has a square shape. The sides 11, 12, 13, 14 of the fuel channel 10 are thus elongated and extend in the longitudinal direction L. The width of the side may suitably be 120-180 mm, for example 140 mm. The sides 11, 12, 13, 14 are connected to each other such that a corner 21, 22, 23, 24 with an elongated shape is formed where two adjacent sides meet. The fuel channel 10 thus has as many corners as sides.

Each side defines an inside (e.g., inner surface) 11a, 12a, 13a, 14a in the fuel channel 10 and an outside (e.g., outer surface) 11b, 12b, 13b, 14b on the outside of the fuel channel 10.

In FIG. 1 a part of the side 12 is shown removed in order to illustrate that the fuel assembly contains a plurality of fuel rods 15 with nuclear fuel material. The fuel channel 10 thus surrounds a bundle of fuel rods 15. The fuel assembly may of course also contain other normal design parts, such as spacers for holding the fuel rods 15 at a distance from each other.

FIG. 1 also shows that the fuel assembly includes a handle 16 at the top (i.e., first axial end 10X) and a connecting piece 17 at the bottom (i.e., second axial end 10Y) of the fuel assembly.

With reference to in particular the FIGS. 2-5 embodiments of a fuel channel 10 according to the invention will be described more closely.

In the corners 21, 22, 23, 24 the sheet material from two adjacent sides overlap with each other such that in the overlapping region a space 31, 32, 33, 34 is formed between the overlapping sheet material from one of the two sides and the overlapping sheet material from the other of the two sides. This is shown in more detail in FIG. 5, which shows one corner 21, but the design is analogous for all corners 21, 22, 23, 24.

Figure 5:
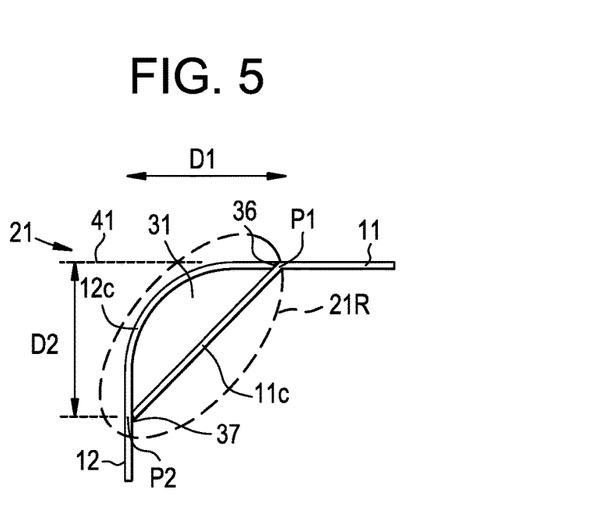
FIG. 5 is a detailed view of a corner region of an embodiment of a fuel channel according to the invention.

As shown in FIG. 5, the corner 21 the sheet materials of side 11 and 12 are adjacent to one another and overlap with each other (e.g., between points P1 and P2) such that the corner 21 defines a corner region 21R with overlapping sheet materials. The corner region 21R is defined by-sheet materials from the side 11 and overlapping the sheet materials from the side 12. The corner region extends in the longitudinal direction along at least fifty percent of the length of the fuel channel 10. The sheet materials of the side 11 and the sheet materials of the side 12 overlap with each other to form an overlapping region (e.g., between points P1 and P2) in which the space 31 is formed between a portion of the sheet materials of the side 11 and the sheet materials of the side 12.

FIG. 5 thus shows that the sheet material from the side 11 overlaps with the sheet material from the side 12 such that the space 31 is formed. The overlapping sheet material 11c from the side 11 and the overlapping sheet material 12c from the side 12 thus form the space 31. The space 31 is open at both ends, as seen in the longitudinal direction L. The space 31 is thus open at the top and at the bottom of the fuel assembly.

As can also be seen in FIG. 5, the inner one 11c of the two overlapping sheet materials is substantially straight (i.e., defining a straight portion 11c of the side 11), while the outer one 12c of the two overlapping sheet materials is bent in order to form the shape of the corner 21. The space 31 thus has, as seen in the cross-section according to FIG. 5, substantially the shape of a triangle, but where one corner is bent, or rather the shape of an arc which is limited by a straight line, for example, limited by the straight portion 11C of an inner one of said overlapping sheet materials of the side 11.

The sheet material from the side 11 has been joined to the sheet material from the side 12 through a weld joint 36 which extends in the longitudinal direction L and which connects the two overlapping sheet materials at one corner of the space 31 and a second weld joint 37, which also extends in the longitudinal direction L, which connects the two overlapping sheet materials at another corner of the space 31. The weld joint 36 may suitably be welded from the outside of the fuel channel 10. The weld joint 37 may be welded from the inside of the fuel channel 10, but it is also possible to weld the weld joint 37 from the outside of the fuel channel 10, by welding through the side 12, 12c.

The spaces 31, 32, 33, 34 suitably extend over substantially the entire length of the fuel channel 10, but it is also conceivable that the spaces 31, 32, 33, 34 only extend over a part of the length of the fuel channel 10.

The inner overlapping region 11c extends from a first point P1 (approximately at the weld joint 36) at the side 11 to a second point P2 (approximately at the weld joint 37) at the side 12. The first side 11 defines a first plane, or a first line 41 if the cross-section shown in FIG. 5 is considered. In a similar manner, the second side 12 defines a similar plane or line (not shown in the figures). The distance D2 between the second point P2 and the first line 41 is suitably 15-17 mm. In a corresponding manner, the distance D1 between the first point P1 and the second plane or the second line (which are not shown in the figure) is suitably 15-17 mm.

A fuel channel 10 with a square cross-section is suitably produced from four sheets. The sheets are suitably made of a Zr-based alloy. In order to distinguish the sheets from each other, every second sheet is shown with a broken line in FIGS. 3 and 4.

Figure 4:
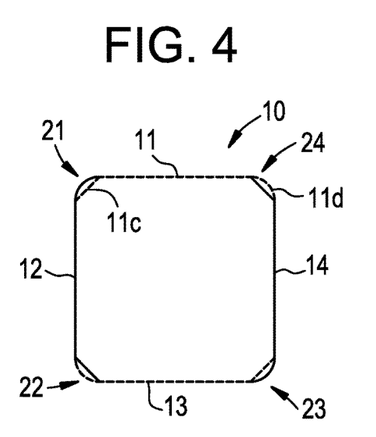
FIG. 4 is a schematic cross-sectional view of another embodiment of a fuel channel according to the invention.

FIG. 4 shows an embodiment where four identical sheets are used. For, for example, the sheet 11 it is the case that it has a first edge configured for constituting the inner one 11c of the two overlapping sheet materials of the corner 21 and a second edge 11d which is configured such that it constitutes the outer one of the two overlapping sheet materials of another corner 24.

Figure 3:
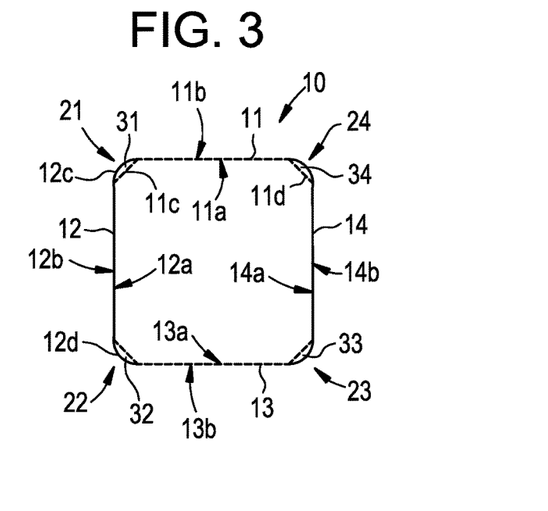
FIG. 3 is a schematic cross-sectional view through an embodiment of a fuel channel according to the invention.

FIG. 3 shows another embodiment where the sheets 11 and 13 have the same shape. The sheet 11 here has a first edge 11c configured such that it constitutes the inner one of the two overlapping sheet materials of the corner 21. The sheet 11 also has a second edge 11d configured such that it constitutes the inner one of the two overlapping sheet materials of the corner 24.

The sheets 12 and 14 have however another shape than the sheets 11 and 13. The sheets 12 and 14 have the same shape. For example the sheet 12 has a first edge 12c which is configured such that it constitutes the outer one of the two overlapping sheet materials of the corner 21. The sheet 12 has a second edge 12d which is configured such that it constitutes the outer one of the two overlapping sheet materials of the corner 22.

Figure 2:
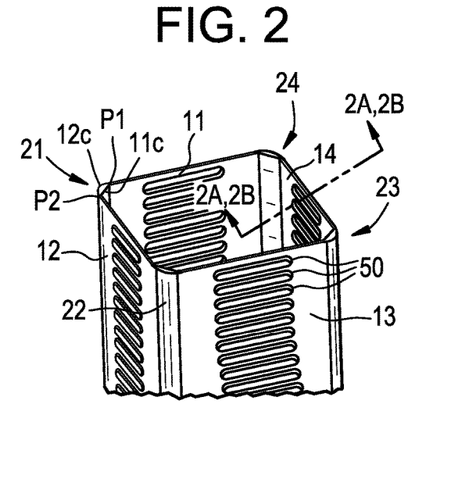
FIG. 2 is a schematic perspective view of the upper part of an embodiment of a fuel channel according to the invention.
Figure 2A:
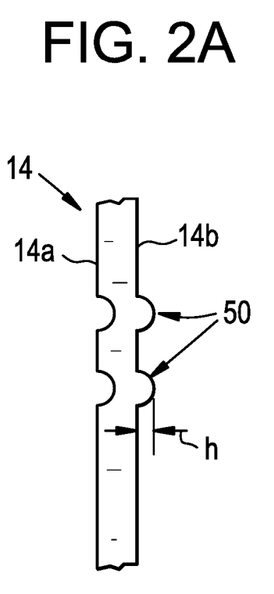
FIG. 2a is a cross sectional view of a portion of a side of the fuel channel of FIG. 2 taken across section 2a-2a and showing details of the bulges.
Figure 2B:
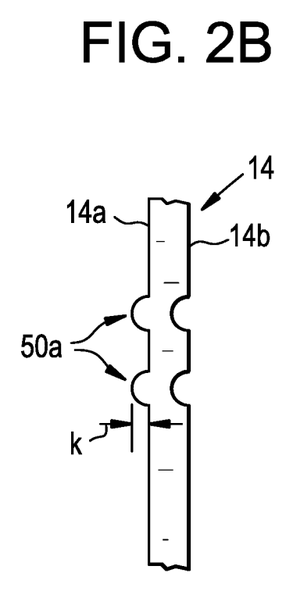
FIG. 2b is a cross sectional view of a portion of a side of the fuel channel of FIG. 2 taken across section 2b-2b and showing details of the indentations.

Each side of the fuel channel 10 is also provided with a plurality of bulges 50 (for the sake of simplicity, the bulges are not shown in FIGS. 3-7). The fuel channel may instead have indentations, or both bulges and indentations. However, bulges 50 are preferred, as shown in FIGS. 1 and 2. These bulges 50 extend substantially perpendicular to the longitudinal direction L of the fuel channel 10. The bulges 50 contribute to increasing the stiffness of the fuel channel 10. The bulges 50 may for example have a length 1 of 50 mm and a width w of 6 mm. The distance d (from centre to centre) between the bulges 50 may for example be 12 mm. The bulges 50 may for example bulge out a height h from the outside 14b, as shown in FIG. 2a for the side 14, of about 1.0 mm. As shown in FIG. 2b for side 14, for example, the indentations 50a curve in a height k from the inside 14a. The main surface on the outside 11b, 12b and/or 13b of the side 11, 12 and/or 13, respectively, can be configured similar to the side 14 as in FIG. 2a and/or FIG. 2b.

Each side 11, 12, 13, 14 may for example have about 300 bulges 50.

The sheet material which form the sides 11, 12, 13, 14, including the edges 11c, 11d, 12c, 12d etc. has substantially a constant thickness, except for at the places where the thickness has been modified by the deformation when forming the fuel channel 10.

Since the design of the fuel channel 10 according to the invention makes the fuel channel very stiff, a relatively thin sheet material can be used. The thickness of the sheet material may for example be 1.90 mm.

Figure 6:
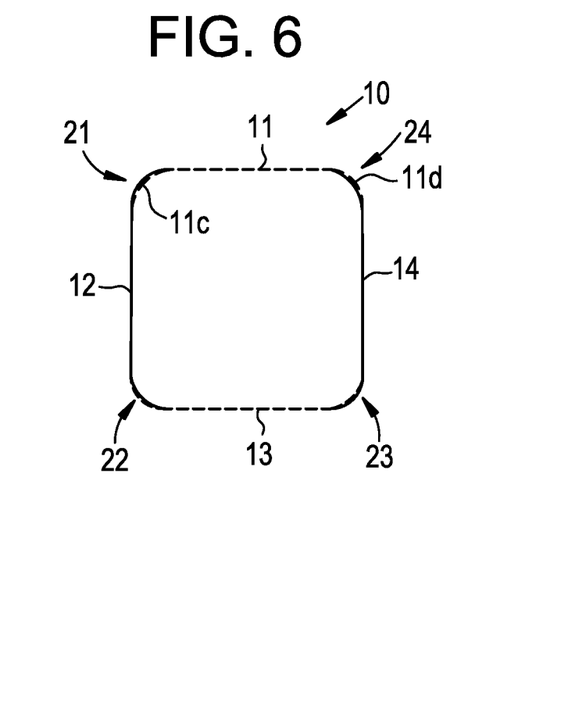
FIG. 6 is a schematic cross-sectional view of a further embodiment of a fuel channel according to the invention.
Figure 7:
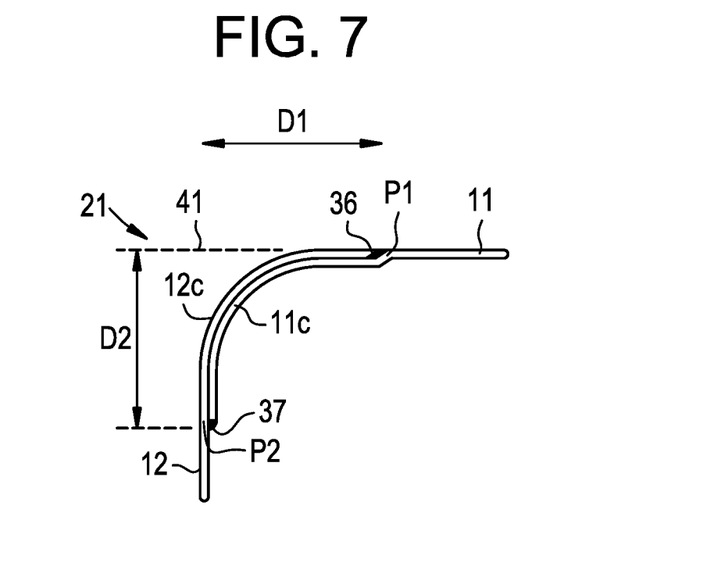
FIG. 7 is a detailed view of a corner region of the embodiment according to FIG. 6.

FIGS. 6 and 7 show a further embodiment of the invention. This embodiment corresponds to the embodiments which have been described above, inter alia, in that in each corner (for example in the corner 21 which is shown more in detail in FIG. 7) the sheet materials from the two adjacent sides 11, 12 overlap with each other such that there is a corner region with double sheet material consisting of the overlapping sheet material 11c from one 11 of the two sides and the overlapping sheet material 12c from the other 12 of the two sides. However, this embodiment differs from the previously described in that the inner overlapping sheet material (11c in FIG. 7) is bent such that it follows the curvature of the outer overlapping sheet material 12c. That is, according to this embodiment there is no space 31, or at least no substantial space 31, between the overlapping sheet materials 11*c* and 12*c*.

In order to prevent water from penetrating into a possible gap between the overlapping sheet materials 11*c* and 12*c*, the sheet materials ought, according to this embodiment, suitably be connected, suitably by a sealing weld joint, at the top and at the bottom (with regard to the longitudinal direction L) in the corner region with overlapping sheet materials.

As for the rest, a fuel channel according to this embodiment may be designed in a similar manner as has been described in the previous embodiments.

The invention is not limited to the described embodiments but may be varied and modified within the scope of the following claims.

What is claimed is:

1. A fuel channel for a nuclear power boiling water reactor, the fuel channel being configured to include a bundle of fuel rods with nuclear fuel, the fuel channel being made of sheet materials and having an elongated shape and defining a longitudinal direction and comprises:
    an assembly of four discrete major sides, each of said major sides extending between a first axial end and a second axial end of the fuel channel and each of which have an elongated shape in said longitudinal direction and which are connected to each other such that a corner, which has an elongated shape and which extends in said longitudinal direction, is formed where any two of said major sides that are adjacent to one another, meet;
    wherein said major sides are connected to each other such that the fuel channel has four of said corners;
    wherein each of said major sides defines an inner surface facing an interior area of the fuel channel, and an outer surface facing outwardly from the fuel channel; and
    in each of at least two of said corners the sheet materials from two of the major sides that are adjacent to one another, overlap with each other such that each said corner defines a corner region with overlapping sheet materials, said corner region defined by a first of said sheet materials from one of the major sides that are adjacent to one another and an overlapping one of a second of said sheet materials from the other of the major sides that are adjacent to one another;
    wherein said corner region with said overlapping sheet materials extends in said longitudinal direction along at least fifty percent of the length of the fuel channel;
    wherein in each of said at least two corners, said first of said sheet materials and said second of said sheet materials overlap with each other to form an overlapping region in which a space is formed between said first of said sheet materials and said second of said sheet materials;
    wherein in at least one of said corners, an inner one of said overlapping sheet materials is substantially straight, while an outer one of said overlapping sheet materials is configured to form an outer corner shape, such that said space, as seen in a cross section of the fuel channel, has substantially a triangular shape, wherein one corner is bent, or arc shape which is limited by a straight portion of the inner one of said overlapping sheet materials; and
    wherein in each said corner having said corner region with said overlapping sheet materials, the inner one of said overlapping sheet materials extends from a first of said major sides to a second, adjacent one of said major sides, wherein the first major side defines a first plane and the second major side defines a second plane, the first plane is perpendicular to the second plane, and the inner one of said overlapping sheet materials extends diagonally from a first point on the first plane to a second point on the second plane to form the space formed between said first of said sheet materials and said second of said sheet materials.

2. The fuel channel according to claim 1, wherein in all of said corners, the sheet materials for said corners have major sides that are adjacent to one another and that overlap with each other.

3. The fuel channel according to claim 1, wherein each of said corner region with said overlapping sheet materials extends along substantially the entire length of the fuel channel.

4. The fuel channel according to claim 1, wherein said space is open at the first axial end and the second axial end.

5. The fuel channel according to claim 1, wherein a distance between the first point and the second point is 10-25 mm.

6. The fuel channel according to claim 1, wherein a distance between the first point and the second point is 13-19 mm.

7. The fuel channel according to claim 1, comprising, for each said corner region with said overlapping sheet materials, a first weld joint and a second weld joint each extending in the longitudinal direction, wherein the first weld joint connects the two overlapping sheet materials at a first longitudinally extending contact surface of the corner region with the overlapping sheet materials, and the second weld joint connects the overlapping sheet materials at a second longitudinally extending contact surface of the corner region with the overlapping sheet materials.

8. The fuel channel according to claim 1, wherein each said corner in the fuel channel comprises said corner region with said overlapping sheet materials, wherein the fuel channel is formed by four sheets, wherein all of said sheets have a common shape, wherein each sheet has a first edge located at an inner one of the two overlapping sheet materials of one said corner, and a second edge located at an outer one of the overlapping sheet materials of another of said corner.

9. The fuel channel according to claim 1, wherein each said corner in the fuel channel comprises said corner region with said overlapping sheet materials, wherein the fuel channel is formed by a first sheet, a second sheet, a third sheet and a fourth sheet, wherein the first sheet and the second sheet have a first shape having a first edge comprising a first inner one of the overlapping sheet materials of one said corner, and having a second edge comprising a second inner one of the overlapping sheet materials of another said corner, wherein the third sheet and the fourth sheet have a second shape having a third edge comprising a first outer one of the overlapping sheet materials of one said corner, and a fourth edge comprising a second outer one of the overlapping sheet materials of another said corner.

10. The fuel channel according to claim 1, wherein each said major side is provided with at least one of:
    a plurality of elongated bulges, which extend substantially perpendicular to the longitudinal direction of the fuel channel, and which contribute to increasing the stiffness of the fuel channel; and
    a plurality of elongated indentations, which extend substantially perpendicular to the longitudinal direction of the fuel channel, and which contribute to increasing the stiffness of the fuel channel.

11. The fuel channel according to claim 10, wherein at least one of:
- at least a majority of said bulges have a length of 30-80 mm; and
- at least a majority of said indentations have a length of 30-80 mm.

12. The fuel channel according to claim 10, wherein at least one of:
- at least a majority of said bulges have a length of 40-60 mm; and
- at least a majority of said indentations have a length of 40-60 mm.

13. The fuel channel according to claim 10, wherein at least one of:
- at least a majority of said bulges have a width of 4.0-13.0 mm; and
- at least a majority of said indentations have a width of 4.0-13.0 mm.

14. The fuel channel according to claim 10, wherein at least one of:
- at least a majority of said bulges have a width of 5.0-8.0 mm; and
- at least a majority of said indentations have a width of 5.0-8.0 mm.

15. The fuel channel according to claim 10, wherein at least one of:
- all of said bulges have a length of 30-80 mm; and
- all of said indentations have a length of 30-80 mm.

16. The fuel channel according to claim 10, wherein at least one of:
- all of said bulges have a length of 40-60 mm; and
- all of said indentations have a length of 40-60 mm.

17. The fuel channel according to claim 10, wherein at least one of:
- all of said bulges have a width of 4.0-13.0 mm; and
- all of said indentations-have a width of 4.0-13.0 mm.

18. The fuel channel according to claim 10, wherein at least one of:
- all of said bulges have a width of 5.0-8.0 mm; and
- all of said indentations have a width of 5.0-8.0 mm.

19. The fuel channel according to claim 10, wherein at least one of:
- a majority of said bulges bulge out between 0.50-1.50 mm from the outer surface; and
- a majority of said indentations curve in between 0.50-1.50 mm from the inner surface.

20. The fuel channel according to claim 10, wherein at least one of:
- all of said bulges bulge out between 0.50-1.50 mm from the outer surface; and
- all of said indentations curve in between 0.50-1.50 mm from the inner surface.

21. The fuel channel according to claim 10, wherein at least one of:
- each major side comprises at least 50 of said bulges; and
- each major side comprises at least 50 of said indentations.

22. The fuel channel according to claim 10, wherein at least one of:
- each major side comprises at least 80 of said bulges; and
- each major side comprises at least 80 of said indentations.

23. The fuel channel according to claim 10, wherein at least 50% of said bulges and said indentations are said bulges.

24. The fuel channel according to claim 10, wherein 100% of said bulges and indentations are said bulges.

25. The fuel channel according to claim 1, wherein the sheet material which forms the major sides of said fuel channel has substantially a constant thickness, except for at least one of:
- at said corners;
- at said bulges;
- at said indentations; and
- at said overlapping sheet materials.

26. A fuel assembly for a nuclear power boiling water reactor, comprising the fuel channel of claim 1 and a plurality of fuel rods with nuclear fuel material arranged such that the fuel channel surrounds the fuel rods.

* * * * *